United States Patent [19]

Isaac et al.

[11] 3,890,352
[45] June 17, 1975

[54] DIOXOLANYL CARBONYL CARBOXAMIDES

[75] Inventors: Eirlys R. Isaac, Sittingbourne; Peter Kirby, Maidstone, both of England

[73] Assignee: Shell Oil Company, Houston, Tex.

[22] Filed: June 25, 1974

[21] Appl. No.: 482,933

[30] Foreign Application Priority Data
July 3, 1973 United Kingdom............... 31604/73

[52] U.S. Cl.................................. 260/340.9; 71/88
[51] Int. Cl............................................ C07c 103/86
[58] Field of Search................................ 260/340.9

[56] References Cited
OTHER PUBLICATIONS

Smith, The Chemistry of Open-Chain Organic Nitrogen Compounds, Vol. 1, (1965) page 157.
Kirby et al., Chemical Abstracts, Vol. 78 (1973) 72112w.

*Primary Examiner*—Lorraine A. Weinberger
*Assistant Examiner*—Richard L. Raymond

[57] ABSTRACT

New compounds of the formula

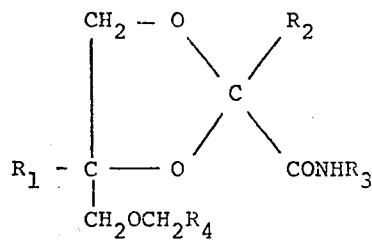

wherein $R_1$ and $R_2$ each is alkyl, $R_3$ is an optionally substituted alkyl-, alkenyl-or aryl-carbonyl group and $R_4$ is optionally substituted phenyl, are useful as herbicides.

3 Claims, No Drawings

DIOXOLANYL CARBONYL CARBOXAMIDES

DESCRIPTION OF THE INVENTION

This invention relates to amide derivatives which are of interest as herbicides.

Accordingly the present invention provides amide derivatives of general formula:

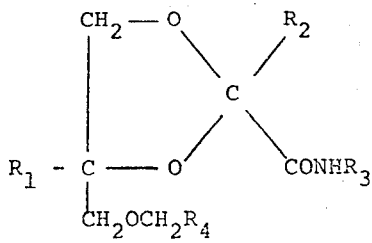   I wherein $R_1$ and $R_2$ each represents an alkyl group; $R_3$ represents an alkyl-, alkehyl- or aryl-carbonyl group optionally substituted by chlorine; and $R_4$ represents a phenyl group optionally substituted by halogen or by alkyl.

Here particularly, the invention is directed to amide derivatives of general formula I wherein $R_1$ and $R_2$ each represents an alkyl group of 1–6 carbon atoms; $R_3$ represents an alkyl-, alkenyl- or aryl-carbonyl group of up to 8 carbon atoms optionally substituted by one or more fluorine or chlorine atoms or by an alkyl group of 1–6 carbon atoms.

Most active, and therefore most preferred amide derivatives appear to be those of formula I wherein $R_1$ and $R_2$ each represents an alkyl group of 1–6 carbon atoms, for example methyl, ethyl, or propyl; and $R_4$ represents a phenyl group optionally substituted by one or two chlorine atoms or by an alkyl group of 1–6 carbon atoms, for example by methyl.

The compounds of formula I may be prepared by a process which comprises reacting a compound of formula:

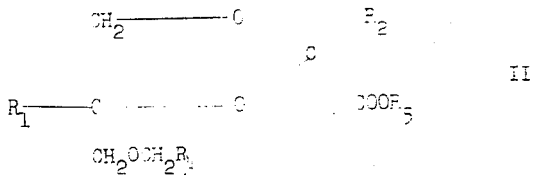   II wherein $R_5$ represents an alkyl group with an amine of formula:

$$NH_2R_3$$   III

The reaction is suitably carried out in the presence of a strong base, for example an alkali metal hydride such as sodium hydride. The compounds of formula II wherein $R_5$ represents alkyl are known compounds, disclosed in Netherlands Pat. No. 72,07026.

As mentioned above the amide derivatives of the invention are of interest as herbicides, and the invention includes therefore, herbicidal compositions comprising a carrier and/or a surface active agent, together with, as active ingredient, an amide derivative of the invention. Likewise the invention also includes a method of combating weeds at a locus which comprises applying to the locus an amide derivative or composition of the invention.

The term "carrier" as used herein means a solid or fluid material, which may be inorganic or organic and of synthetic or natural origin, with which the active compound is mixed or formulated to facilitate its application to the plant, seed, soil or other object to be treated, or its storage, transport or handling.

The surface-active agent may be an emulsifying agent or a dispersing agent or a wetting agent; it may be nonionic or ionic.

Any of the carrier materials or surface-active agents usually applied in formulating pesticides may be used in the compositions of the invention, and suitable examples of these are to be found, for example, in UK specification No. 1,232,930.

The compositions of the invention may be formulated as wettable powders, dusts, granules, solutions, emulsifiable concentrates, emulsions, suspension concentrates or aerosols. Wettable powders are usually compounded to contain 25, 50 or 75% w of toxicant and usually contain, in addition to solid carrier, 3–10% w of a dispersing agent and, where necessary, 0–10% w of stabiliser(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% w of toxicant. Granules arer usually prepared to have a size between 10 and 100 BS mesh (1.676–0.152mm), and may be manufactured by agglomeration or impregnation techniques. Generally, granules will contain ½–25% w active ingredient and 0–10% w of additives such as stabilisers, slow release modifiers and binding agents. Emulsifiable concentrates usually contain, in addition to the solvent and, when necessary, co-solvent, 10–50% w/v active ingredient, 2–20% w/v emulsifiers and 0–20% w/v of appropriate additives such as stabilisers, penetrants and corrosion inhibitors. Suspension concentrates are compounded so as to obtain a stable, non-sedimenting, flowable product and usually contain 10–75% w active ingredient, 0.5–15% w of dispersing agents, 0.1–10% w of suspending agents such as protective colloids and thixotropic agents, 0–10% w of appropriate additives such as defoamers, corrosion inhibitors, stabilisers, penetrants and stickers, and as carrier, water or an organic liquid in which the active ingredient is substantially insoluble; certain organic solids or inorganic salts may be dissolved in the carrier to assist in preventing sedimentation or as antifreeze agents for water.

Aqueous dispersions and emulsions, for example, compositions obtained by diluting a wettable powder or a concentrate according to the invention with water, also lie within the scope of the present invention. The said emulsions may be of the water-in-oil or of the oil-in-water type, and may have a thick "mayonnaise"-like consistency.

The compositions of the invention may also contain other ingredients, for example, other compounds possessing pesticidal, especially insecticidal, acaricidal, herbicidal or fungicidal properties.

The invention is further illustrated by the following examples. It should be understood, however, that the examples are for the purpose of illustration only and

EXAMPLE 1

Preparation of 4-Benzyloxymethyl-2,4-dimethyl-1,3-dioxolan-2-(N-acetyl) carboxamide 4-Benzyloxymethyl-2,4-dimethyl-1,3-dioxolane-2-carboxamide (2.65g) added to a suspension of sodium hydride (0.48g of 50% dispersion in oil) in toluene. The mixture was refluxed for 10 minutes, cooled and treated with excess acetyl chloride (1ml) and then again refluxed for one hour. The reaction product was washed with water, dried and solvent evaporated under reduced pressure. The residue was purified (chromatography on silica gel using 10% ether in chloroform as eluant). The product (1.7g, 55%) has an $n_D^{17}$, 1.5123.

Analysis: Calculated for $C_{16}H_{21}NO_5$: C 62.5; H 6.9; N 4.5%
Found: C 62.8; H 6.9; N 4.0%

Examples 2–4 Followingg procedures similar to those given in the previous Examples further compounds were prepared, for which physical characteristics are given in the follwoing Table I.

Table I

| Ex. | Compound | m.p.°C or refractive index |
|---|---|---|
| 2 | 4-benzyloxymethyl-2,4-dimethyl-1,3-dioxolan-2-(N-propen-1-ylcarbonyl)carboxamide | $n_D^{22}$1.5208 |
| 3 | 4-benzyloxymethyl-2,4-dimethyl-1,3-dioxolan-2-(N-2,3,6-trichlorophenylcarbonyl)-carboxamide | $n_D^{22}$1.5563 |
| 4 | 4-benzyloxymethyl-2,4-dimethyl-1,3-dioxolan-2-(N-chloromethylcarbonyl)carboxamide | low m.p. waxy solid |

What is claimed is:
1. An amide derivative of the formula:

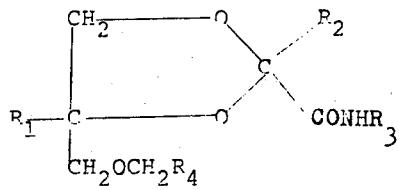

wherein $R_1$ and $R_2$ each represents an alkyl group of 1–6 carbon atoms, $R_3$ represents an alkyl-, alkenyl-or aryl-carbonyl group of up to 8 carbon atoms optionally substituted by chlorine, and $R_4$ represents a phenyl group optionally substituted by fluorine or chlorine or by an alkyl group of 1–6 carbon atoms.

2. An amide derivative according to claim 1 wherein $R_4$ represents a phenyl group optionally substituted by one or two chlorine atoms or by an alkyl group of 1–6 carbon atoms.

3. An amide derivative according to claim 1 wherein $R_1$ and $R_2$ each is methyl, $R_3$ is acetyl, propen-1-carbonyl, 2,3,6-trichlorophenylcarbonyl or chloromethylcarbonyl and $R_4$ is phenyl.

* * * * *